US008475263B2

(12) United States Patent
Rommerdahl et al.

(10) Patent No.: US 8,475,263 B2
(45) Date of Patent: *Jul. 2, 2013

(54) GAMING MACHINE SYSTEM AND METHOD HAVING A PERCEIVED SKILL COMPONENT

(75) Inventors: Bill Rommerdahl, Huntington Beach, CA (US); Thomas F. Cardin, Jr., Huntington Beach, CA (US); Joe Sengir, Rio Rancho, NM (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/595,550

(22) Filed: Aug. 27, 2012

(65) Prior Publication Data

US 2012/0322531 A1 Dec. 20, 2012

Related U.S. Application Data

(63) Continuation of application No. 13/315,207, filed on Dec. 8, 2011, now Pat. No. 8,251,799, which is a continuation of application No. 11/558,854, filed on Nov. 10, 2006, now Pat. No. 8,075,391.

(51) Int. Cl.
*A63F 9/24* (2006.01)
*A63F 13/00* (2006.01)

(52) U.S. Cl.
USPC .................................. 463/20; 463/16; 463/25

(58) Field of Classification Search
USPC ................ 463/16–20, 25–29; 273/138.1, 139
See application file for complete search history.

(56) References Cited

U.S. PATENT DOCUMENTS

| | | | | |
|---|---|---|---|---|
| 6,113,098 | A * | 9/2000 | Adams | 273/143 R |
| 6,347,996 | B1 * | 2/2002 | Gilmore et al. | 463/17 |
| 6,443,837 | B1 * | 9/2002 | Jaffe et al. | 463/16 |
| 6,749,500 | B1 * | 6/2004 | Nelson et al. | 463/13 |
| 6,780,103 | B2 * | 8/2004 | Bansemer et al. | 463/7 |
| 7,416,484 | B1 * | 8/2008 | Nelson et al. | 463/25 |
| 8,002,620 | B2 * | 8/2011 | Nicely et al. | 463/16 |
| 8,075,391 | B2 * | 12/2011 | Rommerdahl et al. | 463/20 |
| 8,251,799 | B2 * | 8/2012 | Rommerdahl et al. | 463/20 |
| 2002/0077165 | A1 * | 6/2002 | Bansemer et al. | 463/7 |
| 2002/0142821 | A1 * | 10/2002 | Baerlocher | 463/16 |
| 2003/0003980 | A1 * | 1/2003 | Moody | 463/16 |
| 2003/0027619 | A1 * | 2/2003 | Nicastro, Sr. | 463/16 |
| 2003/0069057 | A1 * | 4/2003 | DeFrees-Parrott | 463/16 |
| 2003/0104860 | A1 * | 6/2003 | Cannon et al. | 463/25 |
| 2003/0114218 | A1 * | 6/2003 | McClintic | 463/25 |
| 2003/0119580 | A1 * | 6/2003 | McClintic et al. | 463/25 |
| 2003/0119581 | A1 * | 6/2003 | Cannon et al. | 463/25 |
| 2003/0125107 | A1 * | 7/2003 | Cannon | 463/25 |
| 2005/0059456 | A1 * | 3/2005 | Mead et al. | 463/16 |
| 2005/0181855 | A1 * | 8/2005 | Englman et al. | 463/16 |
| 2007/0054733 | A1 * | 3/2007 | Baerlocher | 463/27 |
| 2007/0060243 | A1 * | 3/2007 | Gomez et al. | 463/16 |
| 2007/0135193 | A1 * | 6/2007 | Nicely | 463/11 |
| 2007/0178969 | A1 * | 8/2007 | Luciano et al. | 463/42 |
| 2008/0076576 | A1 * | 3/2008 | Graham et al. | 463/42 |
| 2008/0108410 | A1 * | 5/2008 | Baerlocher | 463/20 |
| 2011/0218035 | A1 * | 9/2011 | Thomas | 463/25 |

* cited by examiner

*Primary Examiner* — Milap Shah
(74) *Attorney, Agent, or Firm* — Marvin Hein

(57) ABSTRACT

Disclosed are a gaming machine system and method including a perceived skill component comprising a skill-based award and a supplemental award that, when summed, are equal in value to a predetermined award.

10 Claims, 8 Drawing Sheets

400

GAMING MACHINE SYSTEM AND METHOD HAVING A PERCEIVED SKILL COMPONENT

CROSS REFERENCES TO RELATED APPLICATION(S)

The present application is a continuation application of U.S. patent application Ser. No. 13/315,207 entitled "GAMING MACHINE AND METHOD HAVING A PERSISTENT SKILL COMPONENT," filed on Dec. 8, 2011, now U.S. Pat. No. 8,251,799 which is a continuation application of U.S. patent application Ser. No. 11/558,854 entitled "GAME AND METHOD HAVING A PERSISTENT SKILL FEATURE," filed on Nov. 10, 2006, now U.S. Pat. No. 8,075,391 both hereby incorporated by reference in their entirety for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

The present invention is directed to gaming games and methods and, more particularly, to gaming machines and methods that have a perceived skill component.

In the prior art, various types of gaming machines have been developed with different features to captivate and maintain player interest. In general, a gaming machine allows a player to play a game in exchange for a wager. Depending on the outcome of the game, the player may be entitled to an award which is paid to the player by the gaming machine, normally in the form of currency or game credits. Gaming machines may include flashing displays, lighted displays, or sound effects to capture a player's interest in a gaming device.

Another important feature of maintaining player interest in a gaming machine includes providing the player with many opportunities to win awards, such as cash or prizes. For example, in some slot machines, the display windows show more than one adjacent symbol on each reel, thereby allowing for multiple-line betting. Some gaming machines offer a player the opportunity to win millions of dollars by providing progressive jackpots. Additionally, feature games of various types have been employed to reward players above the amounts normally awarded on a standard game pay schedule. Generally, such feature games are triggered by predetermined events such as one or more appearances of certain combinations of indicia in a primary game. In order to stimulate interest, feature games are typically set to occur at a gaming machine on a statistical cycle based upon the number of primary game plays.

While gaming machines including feature games have been very successful, there remains a need for games that provide a player with enhanced excitement and increased opportunity of winning

SUMMARY OF THE INVENTION

In accordance with one embodiment of the present invention, a network of gaming machines includes at least one gaming machine including an interface activatable by a player and a first game including a first set of outcomes, at least one of the first set of outcomes determined after activation of the interface by the player. The game further includes a second game comprising a second set of outcomes, at least one of the second set of outcomes determined upon a triggering event associated with the first game. A second game award corresponds to the at least one outcome from the second set of outcomes. The second game award includes a skill award and a supplemental award. The skill award is determined by the skill of the player in playing the second game. When totaled, the skill award and the supplemental award equal the second game award. In accordance with a second embodiment of the invention, the first and second game games are stored in a memory device of a network server, which determines their outcomes for presentation on the at least one gaming machine.

In accordance with a third embodiment of the present invention, a method of operating a networked gaming system includes the steps of connecting a plurality of gaming machines to a server-based network, one or more of the gaming machines including a processor and a non-transitory memory device and comprising a first game and a second game stored in the non-transitory memory device. Under control of the processor, the method further includes the steps of accepting a wager from a player; initiating play of the first game according to the wager; upon a triggering event associated with the game, initiating play of the second game; determining a second game award wherein the second game award is greater than a largest possible skill award; determining a skill award based on the skill of the player in playing the second game; determining a supplemental award by subtracting the amount of the skill award from the determined second game award; and awarding both the skill award and the supplemental award to the player. The supplemental award includes points randomly assigned to a plurality of objects collected by the player at least in part due to skillful play of the second game, after which the assigned points for each object are individually revealed to the player until the entire supplemental award has been revealed.

Other features and advantages will become apparent from the following detailed description, taken in conjunction with the accompanying drawings, which illustrate by way of example, the features of the various embodiments.

DETAILED DESCRIPTION OF THE INVENTION

Figure 1:
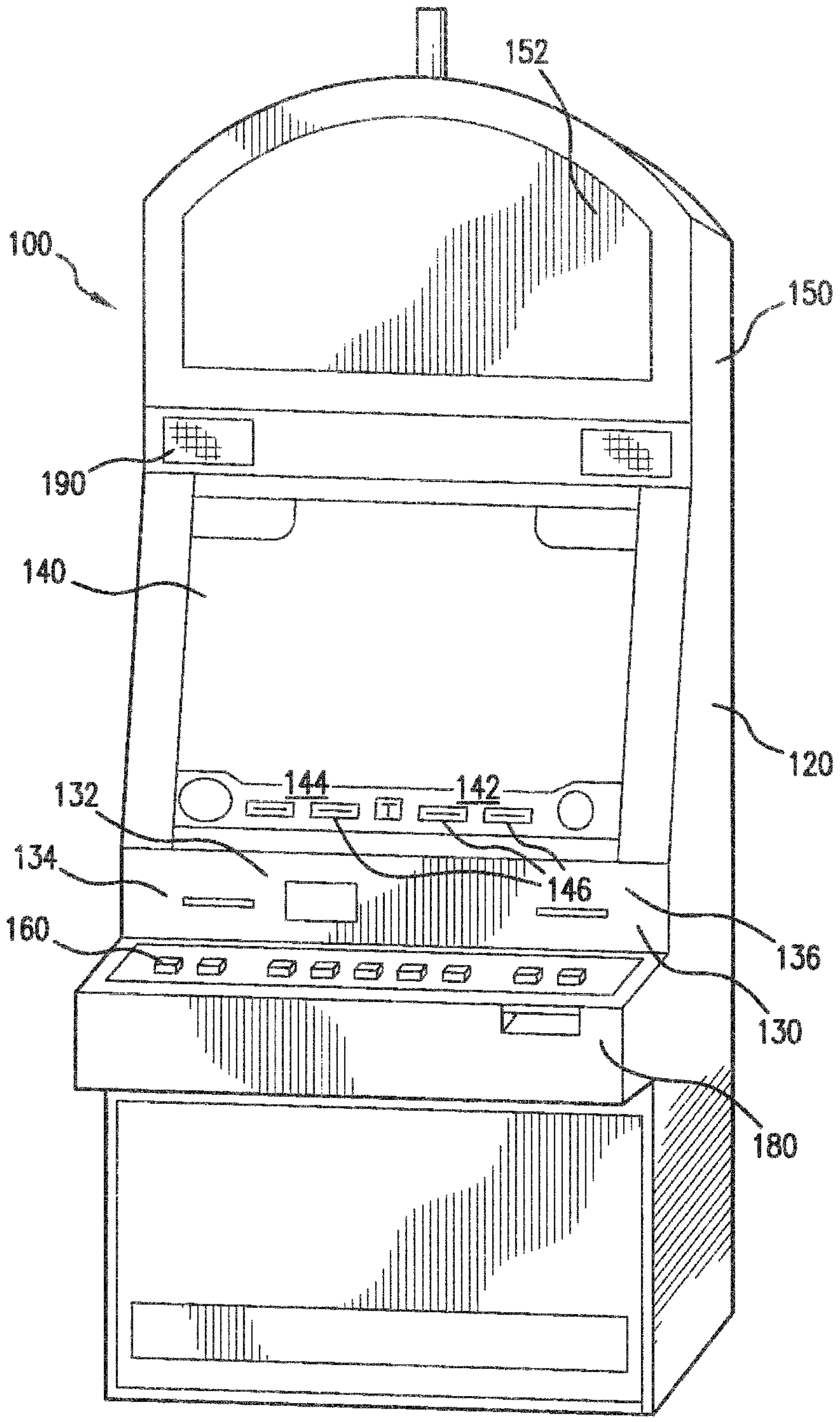
FIG. 1 is a perspective view of a gaming machine in accordance with one aspect of the present invention.

Various embodiments are directed to a game and method for playing a game, wherein the game includes a perceived skill component, that is, a game in which a player's skill appears to affect, but actually has no bearing on, the amount of an award paid for playing the game. Embodiments of the game and method are illustrated and described herein, by way of example only, and not by way of limitation. Referring now to the drawings, and more particularly to FIGS. 1-8, there are shown illustrative examples of a game and a method for playing a game in accordance with various aspects of the invention.

In accordance with one embodiment, FIG. 1 illustrates a gaming machine 100 including cabinet housing 120, primary game display 140, player-activated buttons 160, player tracking panel 136, bill/voucher acceptor 180 and one or more speakers 190. Cabinet housing 120 is a self-standing unit that is generally rectangular in shape and may be manufactured with reinforced steel or other rigid materials which are resistant to tampering and vandalism. Cabinet housing 120 houses a processor, circuitry, and software (not shown) for receiving signals from the player-activated buttons 160, operating the games, and transmitting signals to the respective displays and speakers. Any shaped cabinet may be implemented with any embodiment of gaming machine 100 so long as it provides access to a player for playing a game. For example, cabinet 120 may comprise a slant-top, bar-top, or table-top style cabinet. The operation of gaming machine 100 is described more fully below.

The plurality of player-activated buttons 160 may be used for various functions such as, but not limited to, selecting a wager denomination, selecting a game to be played, selecting a wager amount per game, initiating a game, or cashing out money from gaming machine 100. Buttons 160 function as input mechanisms and may include mechanical buttons, electromechanical buttons or touch screen buttons. Optionally, a handle (not shown) may be rotated by a player to initiate a game.

In other embodiments, buttons 160 may be replaced with various other input mechanisms known in the art such as, but not limited to, a touch screen system, touch pad, track ball, mouse, switches, toggle switches, or other input means used to accept player input. For example, one input means is a universal button module as disclosed in U.S. application Ser. No. 11/106,212, entitled "Universal Button Module," filed on Apr. 14, 2005, which is hereby incorporated by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand.

Cabinet housing 120 may optionally include top box 150 which contains "top glass" 152 comprising advertising or payout information related to the game or games available on gaming machine 100. Player tracking panel 136 includes player tracking card reader 134 and player tracking display 132. Voucher printer 130 may be integrated into player tracking panel 136 or installed elsewhere in cabinet housing 120 or top box 150.

Game display 140 presents a game of chance wherein a player receives one or more outcomes from a set of potential outcomes. For example, one such game of chance is a video slot machine game, an example of which is entitled Poppit! Slots, further described below. In other aspects of the invention, gaming machine 100 may present a video or mechanical reel slot machine, a video keno game, a lottery game, a bingo game, a Class II bingo game, a roulette game, a craps game, a blackjack game, a mechanical or video representation of a wheel game or the like.

Mechanical or video/mechanical embodiments may include game displays such as mechanical reels, wheels, or dice as required to present the game to the player. In video/mechanical or pure video embodiments, game display 140 is, typically, a CRT or a flat-panel display in the form of, but not limited to, liquid crystal, plasma, electroluminescent, vacuum fluorescent, field emission, or any other type of panel display known or developed in the art. Game display 140 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. Additionally, game display 140 preferably includes a touch screen or touch glass system (not shown) and presents player interfaces such as, but not limited to, credit meter (not shown), win meter (not shown) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated by reference.

Game display 140 may also present information such as, but not limited to, player information, advertisements and casino promotions, graphic displays, news and sports updates, or even offer an alternate game. This information may be generated through a host computer networked with gaming machine 100 on its own initiative or it may be obtained by request of the player using either one or more of the plurality of player-activated buttons 160; the game display itself, if game display 140 comprises a touch screen or similar technology; buttons (not shown) mounted about game display 140 which may permit selections such as those found on an ATM machine, where legends on the screen are associated with respective selecting buttons; or any player input device that offers the required functionality.

Cabinet housing 120 incorporates a single game display 140. However, in alternate embodiments, cabinet housing 120 or top box 150 may house one or more additional displays or components (not shown) used for various purposes including additional game play screens, animated "top glass," progressive meters or mechanical or electromechanical devices such as, but not limited to, wheels, pointers or reels. The additional displays may or may not include a touch screen or touch glass system.

Figure 2:
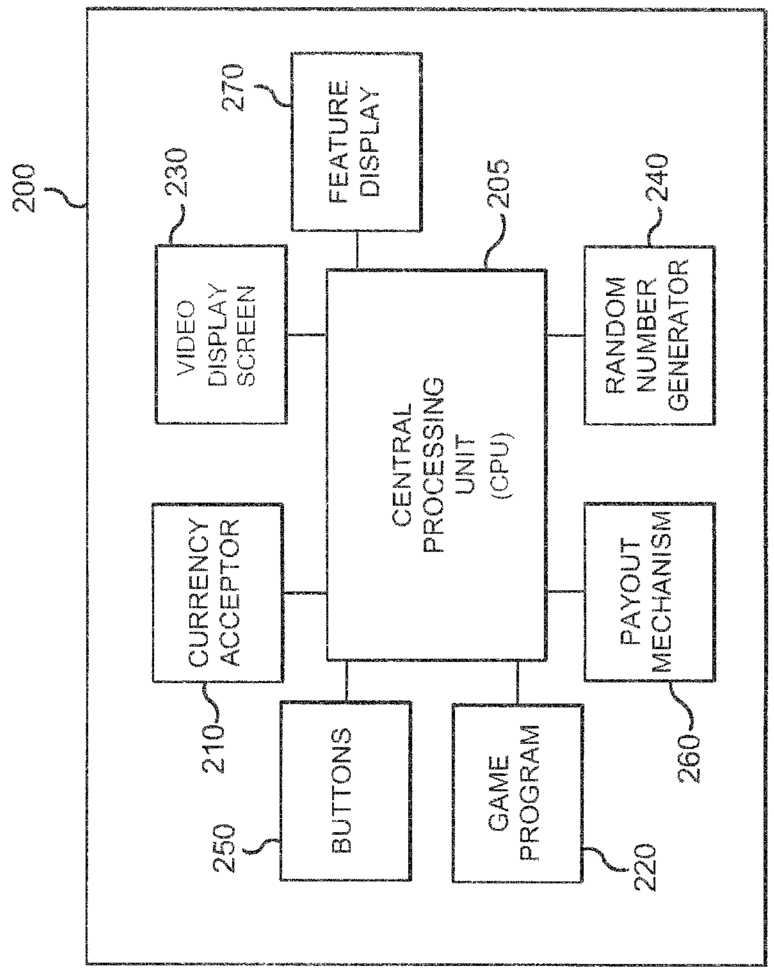
FIG. 2 is a block diagram of the physical and logical components of the gaming machine of FIG. 1.

In accordance with one embodiment of the present invention, FIG. 2 is a block diagram showing the interconnection of physical and logical components 200 of gaming machine 100. Currency acceptor 210 is typically connected to central processing unit ("CPU") 205 by a serial connection such as RS-232 or USB. CPU 205 executes game program 220 that causes video display screen 230 to display a game. In one embodiment, game program 220 is a game entitled Poppit! Slots.

When a player has inserted a form of currency such as, for example and without limitation, paper currency, coins or tokens, cashless tickets or vouchers, electronic funds transfers or the like into currency acceptor 210, a signal is sent to CPU 205 which, in turn, assigns an appropriate number of credits for play. The player may further control the operation of gaming machine 100, for example, to select the amount to wager via electromechanical or touchscreen buttons 250. The game starts in response to the player pushing one of buttons 250. Random number generator 240 responds to instructions from CPU 205 to provide a display of randomly selected indicia on video display screen 230. Thereafter, the player may or may not interact with the game through electromechanical or touchscreen buttons 250 to change the displayed indicia. Finally, CPU 205 under control of game program 220 compares the final display of indicia to a pay table. The set of possible game outcomes may include a subset of outcomes related to the triggering of a feature game. In the event the displayed outcome is a member of this subset, CPU 205, under control of game program 220, causes additional game play to be presented on video display screen 230 as will be described further below.

Predetermined payout amounts for certain outcomes, including feature game outcomes, are stored as part of game program 220. Such payout amounts are, in response to instructions from CPU 205, provided to the player in the form of coins, credits or currency via payout mechanism 260, which may be one or more of a credit meter, a coin hopper, a voucher printer, an electronic funds transfer protocol or any other payout means known or developed in the art.

In embodiments of gaming machine 100, game program 220 is stored in a memory device (not shown). By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with gaming machine 100 are stored in the same or a separate memory device (not shown).

Figure 3:
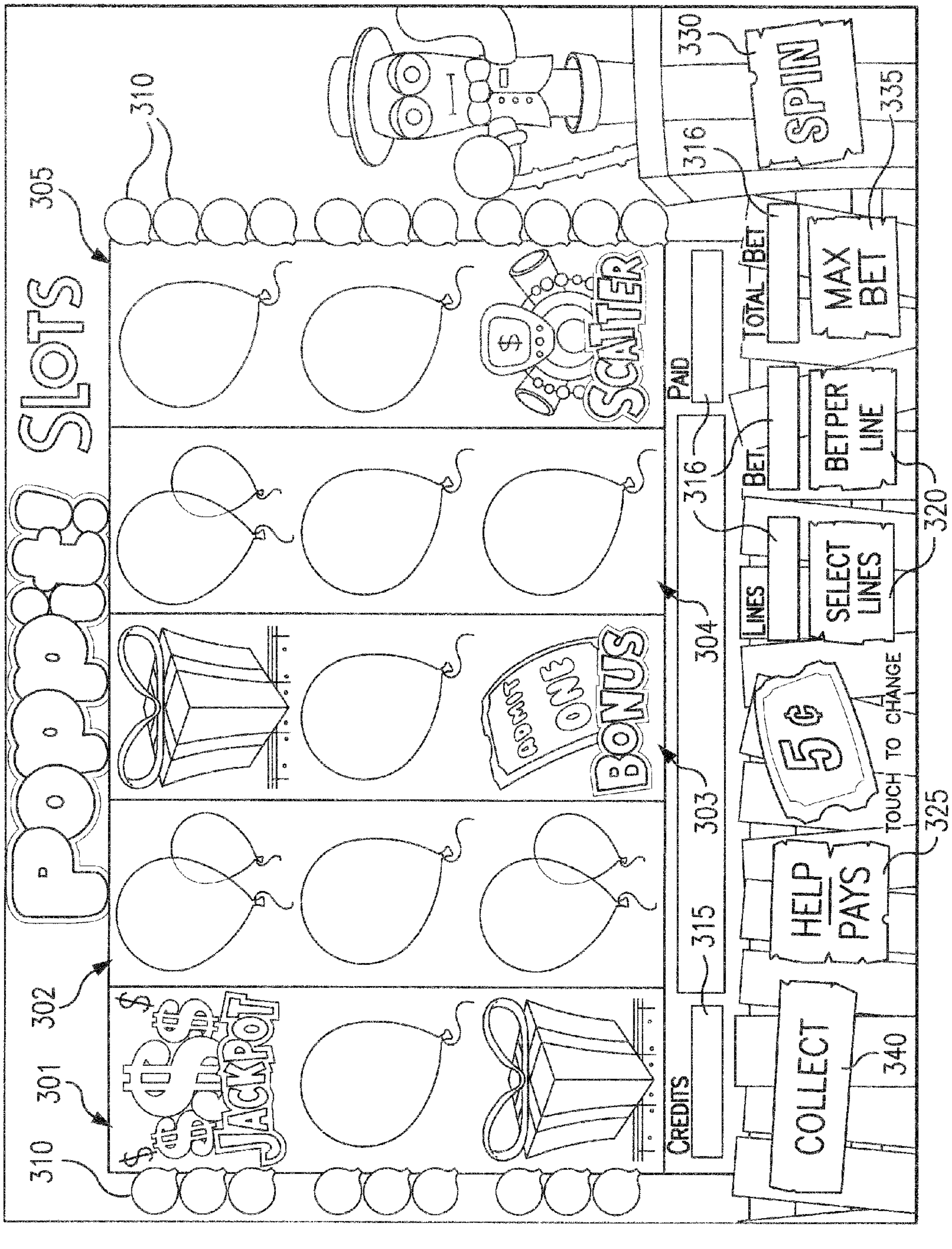
FIG. 3 is a display image associated with a game of one embodiment of the invention.

Turning now to FIG. 3, in accordance with one aspect of the invention, the Poppit! Slots primary game is implemented on video display 300 using five simulated spinning reels 301-305. Each of 20 pay line patterns (not shown) passes through one indicium on each of the five reels 301-305. The number of pay lines and their patterns are by way of example only and may vary. The player selects the number of played pay lines and the number of credits or coins wagered on each line using touch screen controls 320 or gaming device control buttons 160 (FIG. 1). The player may also collect the balance of his credits by pressing COLLECT button 340.

Credit meter 315 display the player's current credit balance, while other meters 316 may display, for example, the number of credits or coins wagered and the last amount paid by the payout mechanism 260 (FIG. 2). Other meters 316 containing other information may be displayed. The amount wagered on each pay line may additionally be indicated in a bet tag 310 corresponding to each pay line.

The player initiates game play by pressing SPIN button 330. In some embodiments, the player may simultaneously select all pay lines at the maximum number of coins or credits allowed per line by pressing a MAX BET touch screen button 335. Corresponding buttons 160 on gaming machine 100 (FIG. 1) may be used instead of the touch screen buttons to perform the actions described here without deviating from the scope of the invention. A video representation of reels 301-305 is made to spin and stop in their predetermined stop positions and then indicate whether the stop positions of the reels resulted in a winning game outcome.

Figure 4:
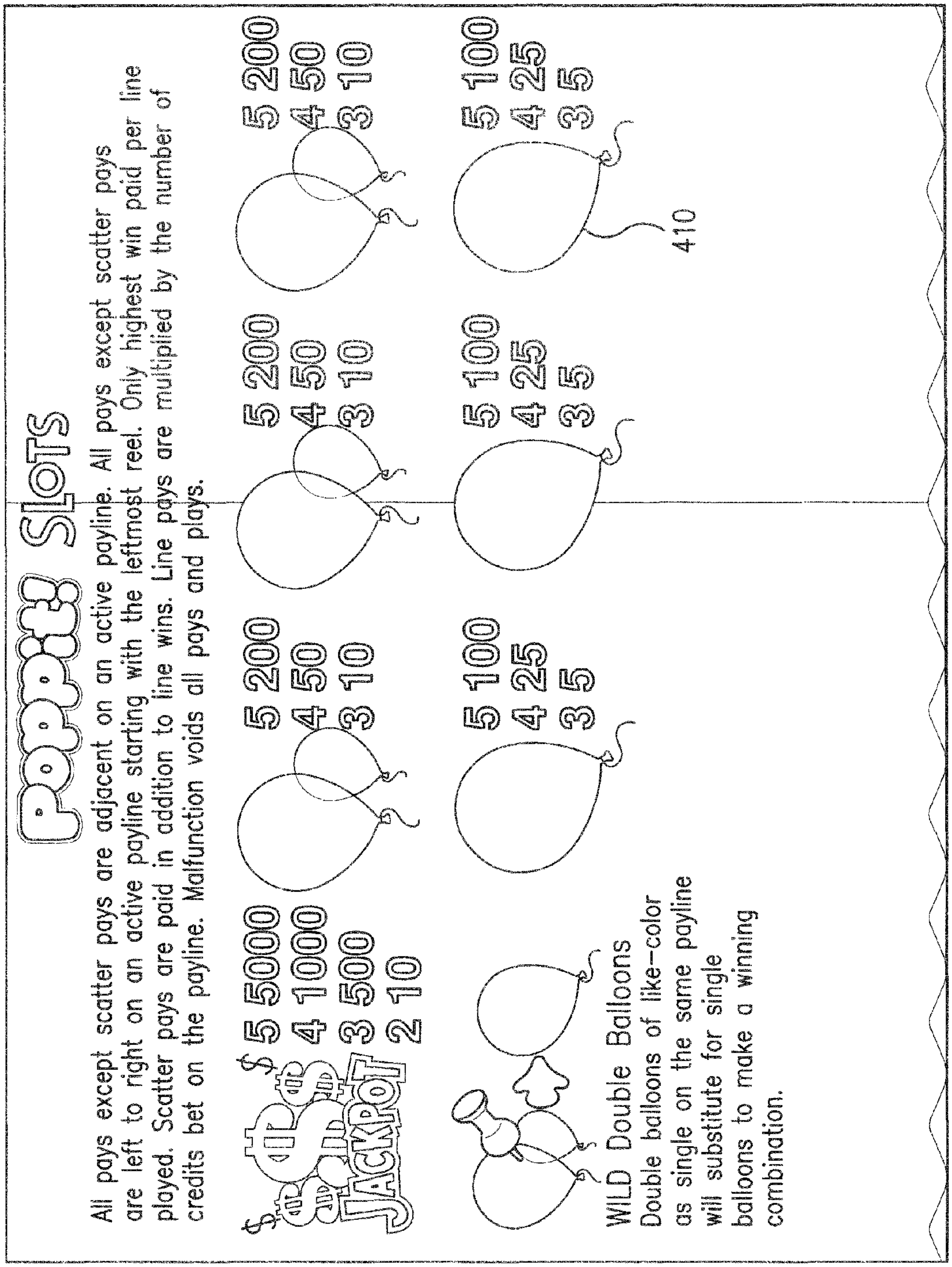
FIG. 4 is a display image associated with a help screen of one embodiment of the invention.

Winning outcomes may be indicated on a pay table. In accordance with one embodiment, part of a pay table 400 is shown in FIG. 4. The pay table may be accessible through a HELP/PAYS button (FIG. 3, 325). In alternate embodiments, the pay table may be presented on a second video or printed display attached to the gaming device (i.e. "pay glass" 152, FIG. 1). A winning combination, for example, could be three or more single balloon symbols 410 adjacent to one another on an active pay line. For each winning combination, the game device awards the player the award in the pay table, adjusted as necessary based on the number of credits wagered on the pay line on which the win occurred. Some video representations of pay tables may factor in the amount of the player's wager and no additional award adjustment is required.

In various embodiments, winning combinations may be evaluated across adjacent reels from left-to-right, from right-to-left or both. Additional winning combinations may be awarded when certain indicia do not necessarily accumulate adjacently on a pay line, but rather, appear anywhere on the reels (i.e., "scatter pays"). In addition, "wild" indicia may be used to complete winning combinations. Some "wild" indicia may also cause completed winning combinations to be result in pay amounts in excess of the normal winning combination by way of multiplication or addition, for example, a wild doubler symbol may be used.

Various primary game outcomes may be utilized to trigger the play of the feature game, including, but not limited to, awarding bonus play when certain symbols appear on a pay line, when certain symbols are scattered, when no symbols of a certain type appear, when a certain winning combination occurs or, regardless of the visible symbols, at random or fixed intervals. In the Poppit! Slots embodiment, appearance of three adjacent Game Ticket symbols on an active pay line from left to right, starting with the left-most reel, trigger the Balloon Pop Feature. In one embodiment, a wager of a certain amount may be required in order to further trigger the feature game.

Figure 5:
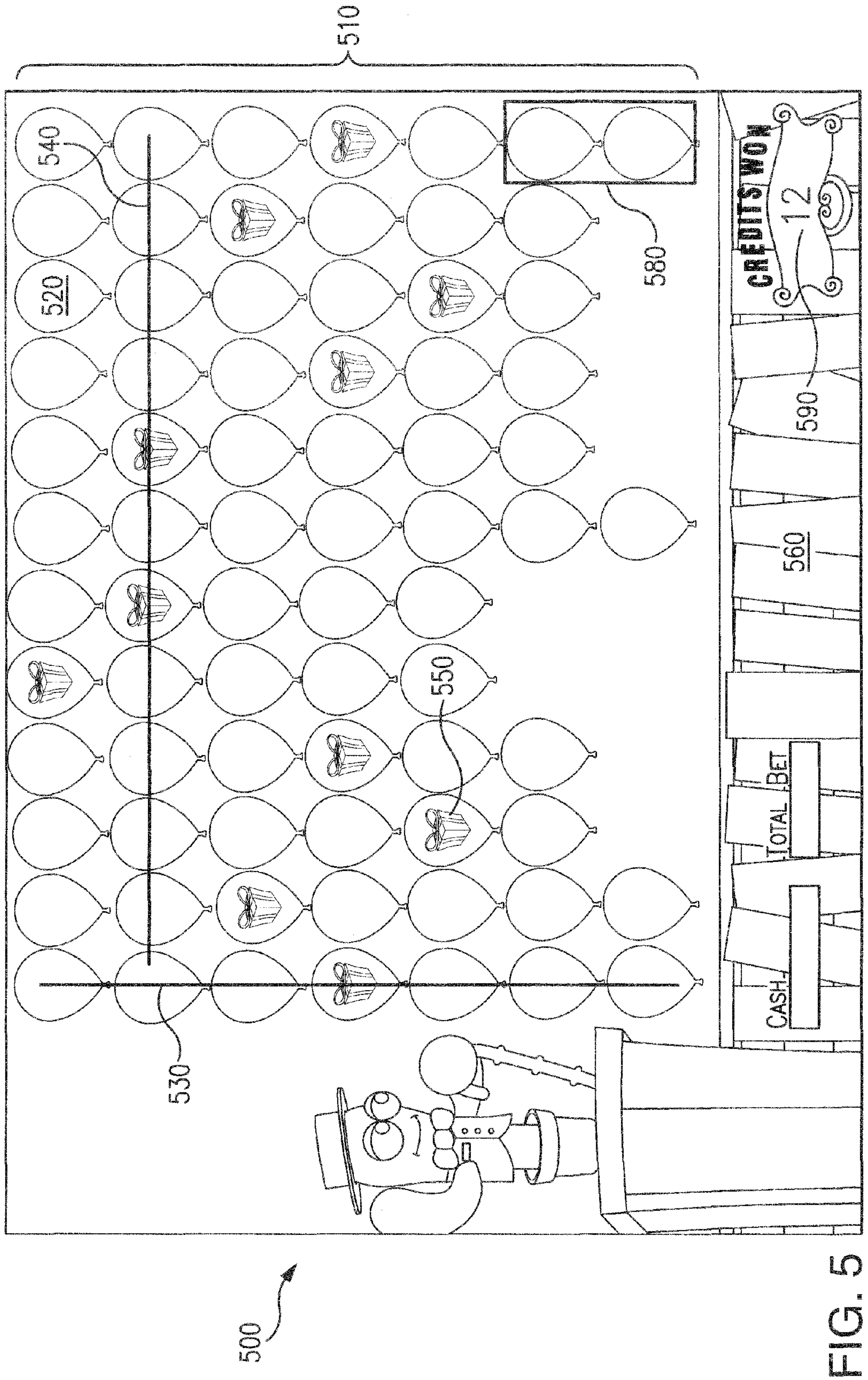
FIGS. 5 and 6 are display images associated with a feature game of one embodiment of the invention.

Turning now to FIG. 5, in accordance with one embodiment of the invention, display 500 presents an example of the Balloon Pop feature game.

The feature game includes a grid 510 of different colored balloons 520 that is, for example, twelve columns 530 wide by seven rows 540 high. Popping a single balloon is accomplished by the player touching the balloon of his choice. In order to pop a balloon of a given color, a balloon of the same color must be horizontally or vertically adjacent to it. When a balloon pops, any horizontally or vertically adjacent balloon of the same color also pops in a recursive manner until no more balloons of that color remain in the group.

As balloons are popped, the remaining balloons in grid 510 float up to fill in the vacated grid locations. The grid columns 530 will also slide together to fill in columns that have been completely popped. Balloons may contain packages 550 that can be freed and collected. The packages stay in their initial rows and columns during the balloon shifts. If popping causes a present to become uncovered and there are no balloons lower in the present's column to float up to cover the present, the present parachutes down to the fence 560 below and is considered collected.

The initial color of the balloon at each location in grid 510 is randomly chosen. Optionally, in an alternate embodiment, the color of each balloon in grid 510 may be predefined. In yet another embodiment, one of a set of predefined balloon color definitions for grid 510 may be randomly selected.

In one embodiment, packages are placed one per column. One column is randomly chosen to have a present in the lowest balloon. The remaining columns' packages' rows are randomly chosen. The column that has its package forced to the bottom row will have the top balloon of an adjacent column changed to match its own top balloon. This will create a pop-able group 580 that insures that at least one present will be collected.

There is no optimal strategy in the feature game nor is it scripted. How the player plays the game has no effect on what he will win. The total amount the player will win is predetermined by a random selection process, for example, a random pick from a prize "bin" of possible awards. This amount is always greater than the amount that can be won in the perceived skill portion of the feature game. The total amount of the award is broken into smaller prize amounts and awarded based on how well the player plays the game. As shown in Tables 1-3 below, the game has a scoring system that determines how the player wins credits by popping balloons. Upon entry to the Balloon Bonus Feature a final score is randomly chosen from a weighted table of scores. The score can range from 107 to 993 points. All point values will be multiplied times the line bet for the winning pay line when displayed. As the player makes choices of balloons to pop, values multiplied times the line bet are awarded and applied to a win meter 590. Bonus values are awarded as follows:

TABLE 1

| BALLOONS POPPED | |
|---|---|
| # in group | Value |
| 2-4 | 1 |
| 5-9 | 2 |
| 10-14 | 3 |
| 15-19 | 5 |
| 20-24 | 7 |
| 25-29 | 9 |
| 30+ | 12 |

TABLE 2

| BALLOONS LEFT BONUS | |
|---|---|
| Number | Value |
| 0 | 25 |
| 1 | 15 |
| 2 | 10 |
| 3 | 5 |

TABLE 3

| SUPER POP BONUS (CONSECUTIVE BALLOON GROUPS OF 11 OR MORE) | |
|---|---|
| Instance | Value |
| $1^{st}$ | 5 |
| $2^{nd}$ | 10 |
| $3^{rd}$ | 15 |
| $4^{th}$ | 20 |
| $5^{th}$ | 25 |
| $6^{th}$ | 30 |
| $7^{th}$ | 35 |

In some embodiments, the player may achieve only a single award based on skill

Figure 6:
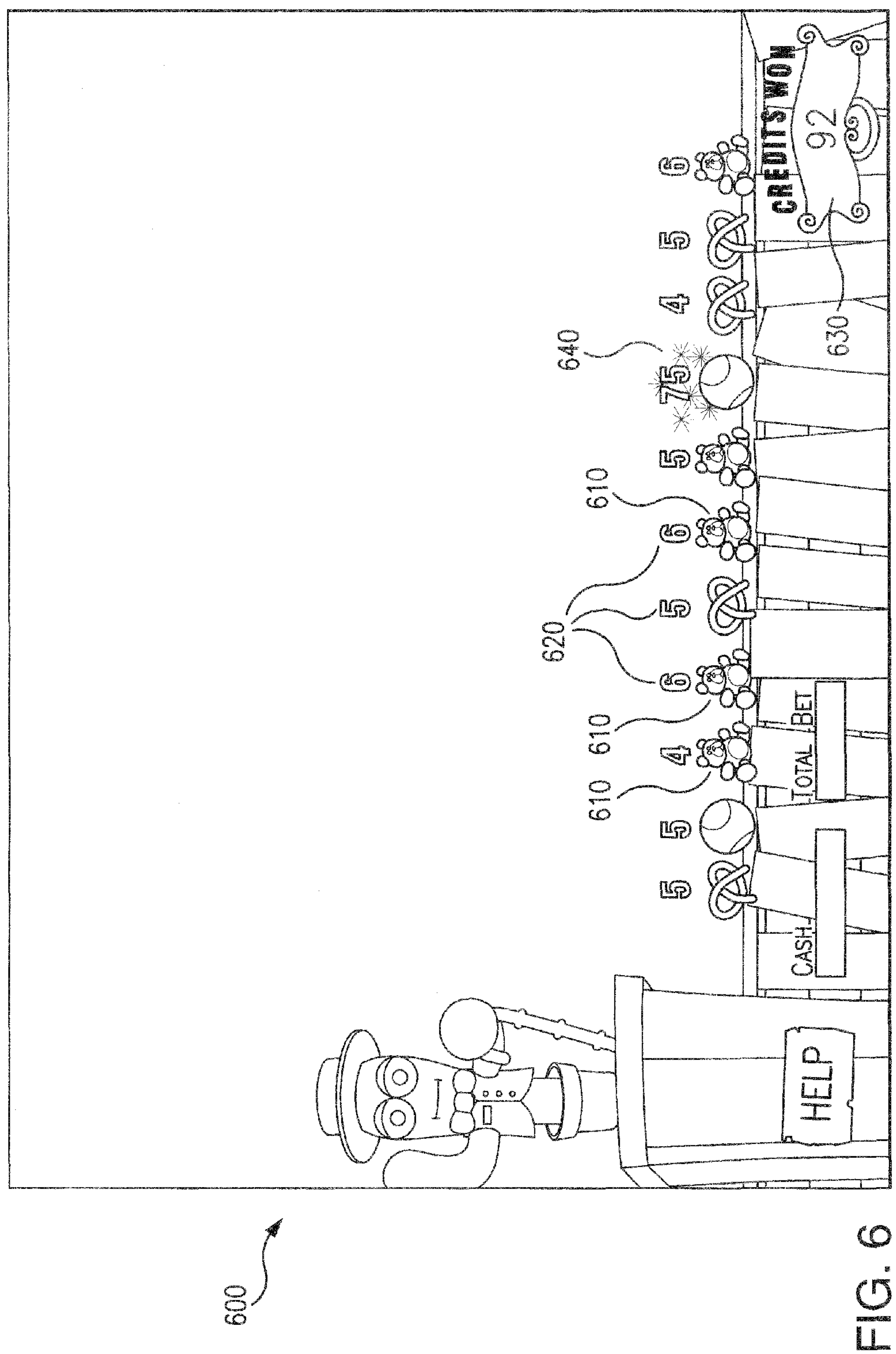

Turning to FIG. 6, in accordance with one embodiment of the invention, display 600 presents the conclusion of a Balloon Pop feature game. With no more balloons able to be popped, the feature transitions into a presentation of the remaining prize points. During the course of the game, at least one package is collected. Collected packages sit on the fence, unopened. When the player can no longer make any more moves popping balloons, the packages that have fallen to the bottom of the screen reveal prizes 610 and award values 620 associated with each prize. The balloon grid is configured to guarantee that there will always be one package in which to put the remainder of the unallocated winning credits.

The score the player achieved from his balloon choices in the skill portion of the game is deducted from the predetermined feature game award amount. This value (TOTAL PRESENT SCORE) is the remaining amount to be allocated among the collected packages. In one embodiment, one point is then given to each of the collected packages. This ensures no present will receive zero points. In another embodiment, if there are at least forty points remaining to be distributed, a "Big Prize" amount is calculated and added to one of the collected packages. The present that receives the "Big Prize" amount is randomly chosen from the collected packages. The "Big Prize" is calculated by adding half of the remaining points and the number of additional points required in order to have the "Big Prize" end in nine so that, when added to one of the packages, that package's total points will end in zero. The remaining points are then randomly distributed to the collected packages.

The packages' values (multiplied by line bet) are then revealed one at a time. If a prize has received the "Big Prize," it may be highlighted 640. In alternate embodiments, the remaining amount is presented as a single value and is not distributed and revealed in smaller pieces.

The feature game concludes by totaling the skill-based and supplemental awards and paying this amount 630 to the player. This amount will equal the feature game award predetermined at the beginning of the feature game.

Figure 7:
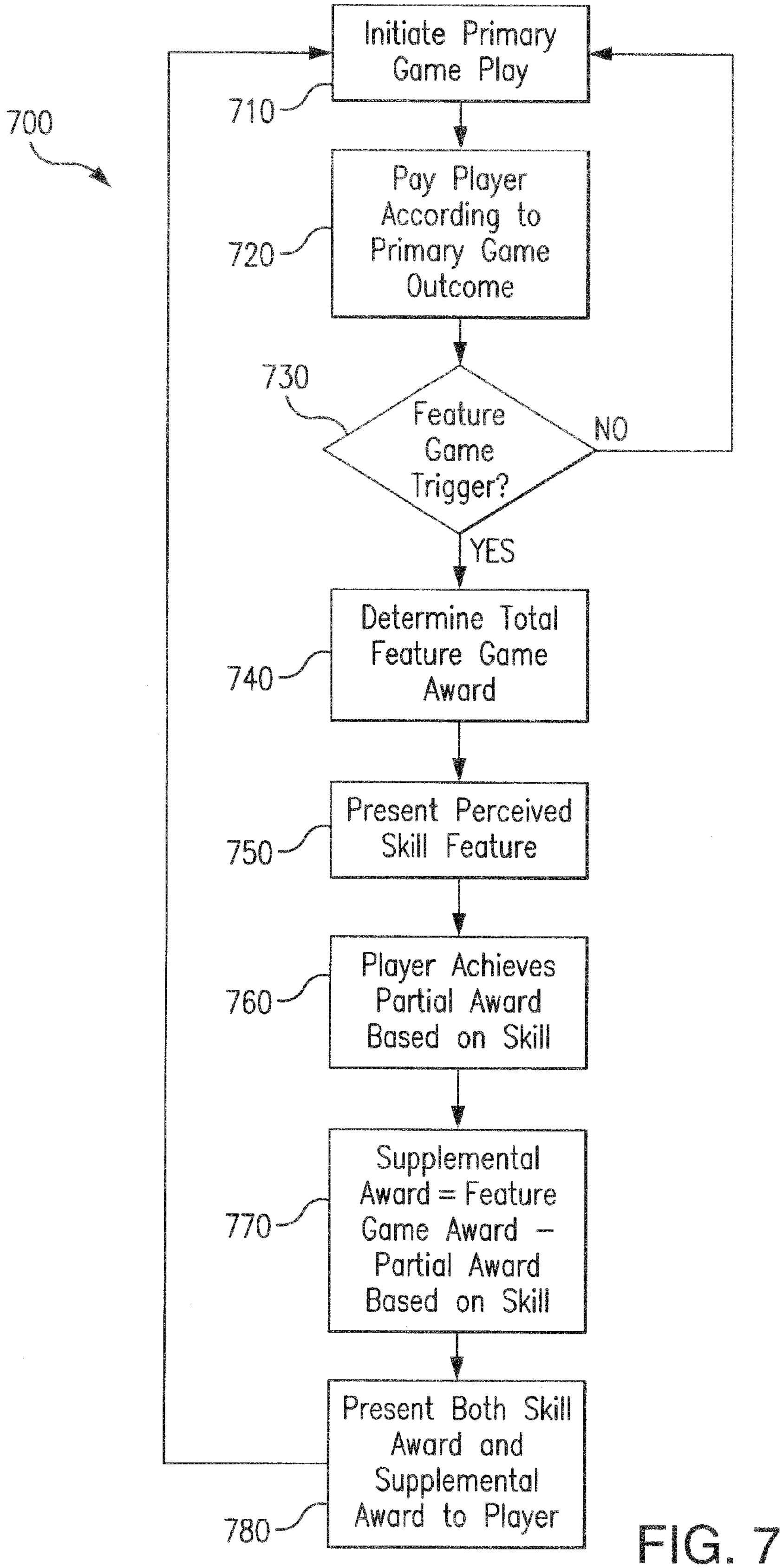
FIG. 7 is a functional block diagram depicting the steps associated with carrying out a method in accordance of one aspect of the invention.

A logical flow diagram generally depicting the steps associated with a method 700 for carrying out a game having a perceived skill component, in accordance with one aspect of the invention, is presented in FIG. 7. The order of actions as shown in FIG. 7 and described below is only illustrative, and should not be considered limiting. For example, the order of the actions may be changed, additional steps may be added or some steps may be removed without deviating from the scope and spirit of the invention.

First, the primary game is initiated by a player at block 710, typically by selecting a wager amount and pressing a start button, pulling a handle or the like. A game outcome is determined and the player is paid for any winning outcomes at block 720.

The primary game outcome and/or any other trigger conditions that might initiate feature game play are considered at decision block 730. For example, the occurrence of a three adjacent Game Ticket symbols on an active pay line may have been predetermined to be the trigger for the feature game. Any predefined feature game trigger criteria may be used to initiate the feature game. In one embodiment, play of the feature game is restricted unless the player has wagered at least a certain amount. In other embodiments, play of the feature game is not restricted based on wager size.

If the triggering event for the feature game has not occurred, the method proceeds to block 710 in an iterative fashion for play of another primary game. Otherwise, the total amount the player will win in the feature game is predetermined by a random selection process, for example, a random pick from a prize "bin" of possible awards, block 740. This amount is always greater than the amount that can be won in the perceived skill portion of the feature game. The skill portion of the feature game is presented for play at block 750. The player interacts with the game by way of a user interface such as one or more buttons, a touchscreen or other suitable controls. Any awards corresponding to the skill portion of the feature game outcome are accumulated at block 760. Though not shown, in some embodiments, multiple iterations of blocks 750-760 are possible.

At the conclusion of the skill portion of feature game play, the accumulated amount achieved by the player is subtracted from the amount of the predetermined feature game award to determine a supplemental award amount: Supplemental award=Feature Game Award−Partial Award Based on Skill, block 770. The skill-based award and the supplemental award are then revealed and awarded to the player at block 780. Primary game play then resumes at block 710 with initiation of another primary game.

Figure 8:
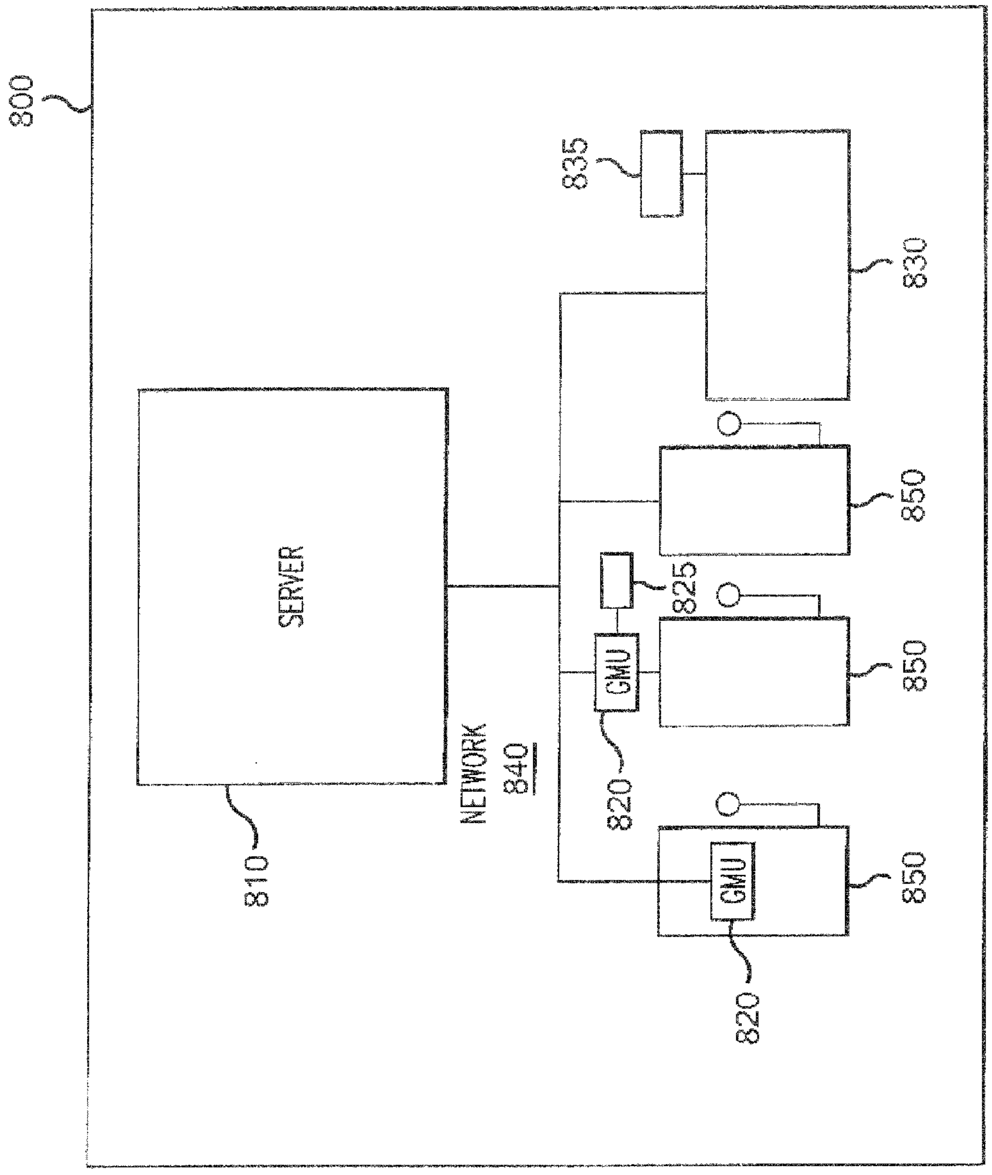
FIG. 8 is a schematic block diagram showing the hardware elements of a networked gaming system in accordance with one aspect of the present invention.

Referring to FIG. 8, in accordance with one aspect of the invention, gaming system 800 includes server 810, gaming machines 850, and network 840 connecting gaming machines 850 to server 810. Additionally, gaming display computer 830 is shown connected to network 840. Server 810 may be selected from a variety of conventionally available servers. The type of server used is generally determined by the platform and software requirements of the gaming system. Examples of suitable servers are an IBM RS6000-based server, an IBM AS/400-based server or a Microsoft Windows-based server, but it should be appreciated that any suitable server may be used. It may also be appreciated that server 810 may be configured as a single "logical" server that comprises multiple physical servers. Gaming machines 850 operate similar to conventional peripheral networked terminals. Gaming machines 850 have a player interface such as a display, a card reader, and selection buttons through which gaming machines 850 interact with a player playing a wagering game having a perceived skill component in accordance with various embodiments of the invention. The player interface is used for making choices such as the amount of a bet or the number of lines to bet. Gaming machines 850 also provide information to server 810 concerning activity on gaming machines 850 and provide a communication portal for players with server 810. For example, the player interface may be used for selecting different server-related menu options such as, but not limited to, transferring a specified number of credits from a player account onto the credit meter of the gaming machine, or for transferring credits from the gaming machine to a central player account.

In various embodiments, any of the gaming machines 850 may be a mechanical reel spinning slot machine, video slot machine, video poker machine, keno machine, video blackjack machine, or a gaming machine offering one or more of the above described primary games including a perceived skill component. Alternately, gaming machines 850 may provide a perceived skill component as one of a set of multiple primary games selected for play by a random number generator. Networking components (not shown) facilitate communications across network 840 between the system server 810 and game management units 820 and/or gaming display control computers 830 that control displays for carousels of gaming machines. Game management units (GMU's) 820 connect gaming machines to networking components and may be installed in the gaming machine cabinet or external to the gaming machine. The function of the GMU is similar to the function of a network interface card connected to a desktop personal computer (PC). Some GMU's have much greater capability and can perform such tasks as presenting and playing a game having feature games with multiple sets of indicia using a display 825 operatively connected to GMU 820. Displays related to games offering a perceived skill component game on gaming machines 850 or GMU displays 825 may also be presented on gaming display 835 by gaming display control computer 830. In one embodiment, GMU 820 is a separate component located outside the gaming machine. Alternatively, in another embodiment, the GMU 820 is located within the gaming machine. Optionally, in an alternative embodiment, one or more gaming machines 850 connect directly to the network and are not connected to a GMU 820. A gaming system of the type described above also allows a plurality of games in accordance with the various embodiments of the invention to be linked under the control of server 810 for cooperative or competitive play in a particular area, carousel, casino or between casinos located in geographically separate areas.

One will appreciate that a gaming system may also comprise other types of components, and the above illustrations are meant only as examples and not as limitations to the types of components or games having a perceived skill component. Additionally, it may further be appreciated that each of the games could be operated on a remote host computer such that a player initiates play with the host computer over a network via the player interface and gaming machine 850 operates the respective gaming and video displays in conjunction with the game whose play is controlled by the remote computer.

The various embodiments described above are provided by way of illustration only and should not be construed to limit the claimed invention. For example, a game that does not have a secondary or feature game associated with it may still have a perceived skill component in accordance with one or more aspects of the invention. In one such embodiment, the primary game comprises the Poppit Balloon Pop logic described above. In an alternate embodiment, a perceived skill game in accordance with one or more aspects of the invention may be one of a set of primary games randomly selected for play following initiation of play by the player. For example, one such means is disclosed in U.S. application Ser. No. 11/428,220, entitled "Multiple Primary Games Triggered by Random Number Generator," filed on Jun. 30, 2006, hereby incorporated in by reference its entirety, in which a gaming machine has at least two distinct primary games. After receiving a wager, the gaming machine determines which primary game to activate. The selected primary game is activated and a game outcome is presented to the player on a game display. A payout may be awarded according to the game outcome. The availability of one or more of the games may be restricted based on the size of the wager.

Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A networked gaming system comprising:

a plurality of gaming machines each comprising a processor and a non-transitory memory device connected through a network to a server-based system, at least one of the gaming machines including:

an interface activatable by a player using one or more input devices of the gaming machine;

a first game, stored in the non-transitory memory device and controlled by the processor, comprising a first set of outcomes, at least one of the first set of outcomes determined for use in the first game after activation of the interface by the player, a second game, stored in the non-transitory memory device and controlled by the processor, comprising a second set of outcomes, at least one of the second set of outcomes determined for use in the second game upon activation in response to a triggering event associated with the first game;

a second game award corresponding to the determined at least one of the second set of outcomes, the second game award comprising a skill award and a supplemental award, the skill award determined by the skill of the player in playing the second game using the interface, the total of the skill award and the supplemental award equaling the second game award, wherein the second game award is always greater than the skill award for every play of the second game; and wherein the supplemental award comprises one or more hidden points randomly assigned to each of a plurality of objects collected by the player at least in part due to skillful play of the second game, such that after completion of play of the second game, the one or more assigned hidden points for each object are individually revealed to the player until the entire supplemental award has been revealed.

2. The gaming system of claim 1 wherein the triggering event comprises the occurrence of a specific one of a set of possible first game outcomes.

3. The gaming system of claim 1 further comprising activation by a wager from the player, wherein play of the second game is restricted by the amount of the wager.

4. The gaming system of claim 1, the first game comprising at least one of a slot machine game, a poker game, a keno game, a blackjack game, a bingo game, a roulette game and a wheel game.

5. A method of operating a networked gaming system, the method including the steps of:

connecting a plurality of gaming machines to a server-based network, one or more of the gaming machines having a processor and a non-transitory memory device and comprising a first game and a second game stored in the non-transitory memory device; and under control of the processor:

accepting a wager from a player;

initiating play of the first game according to the wager;

upon a triggering event associated with the first game, initiating play of the second game;

determining a second game award wherein the second game award is greater than a largest possible skill award;

determining a skill award based on the skill of the player in playing the second game;

determining a supplemental award by subtracting the amount of the skill award from the determined second game award; and awarding both the skill award and the supplemental award to the player;

wherein the supplemental award comprises points randomly assigned to a plurality of objects collected by the player at least in part due to skillful play of the second game, after which the assigned points for each object are individually revealed to the player until the entire supplemental award has been revealed.

6. The method of claim 5 wherein the triggering event comprises a predefined one of the set of first game outcomes.

7. The method of claim 5 further comprising the step of preventing initiation of the second game based on the amount of the wager.

8. The method of claim 5 further comprising the steps of requiring and accepting player input following the occurrence of the triggering event in order to initiate play of the second game.

9. The method of claim 5 wherein the first game comprises at least one of a slot machine game, a poker game, a keno game, a blackjack game, a bingo game, a roulette game and a wheel game.

10. A networked gaming system comprising:

a network;

at least one network server comprising a non-transitory memory device operatively coupled to the network; and a plurality of gaming machines operatively coupled to the one or more network servers via the network, at least one of the plurality of gaming machines comprising:

an interface activatable by a player using one or more input devices of the gaming machine;

a first game, stored in the non-transitory memory device and at least partially controlled by the at least one network server, comprising a first set of outcomes, at least one of the first set of outcomes determined by the processor for use in the first game after activation of the interface by the player, a second game, stored in the non-transitory memory device and at least partially controlled by the at least one network server, comprising a second set of outcomes, at least one of the second set of outcomes determined by the processor for use in the second game upon activation in response to a triggering event associated with the first game;

a second game award corresponding to the determined at least one of the second set of outcomes, the second game award comprising a skill award and a supplemental award, the skill award determined by the skill of the player in playing the second game using the interface, the total of the skill award and the supplemental award equaling the second game award, wherein the second game award is always greater than the skill award for every play of the second game; and wherein the supplemental award comprises one or more hidden points randomly assigned to each of a plurality of objects collected by the player at least in part due to skillful play of the second game, such that after completion of play of the second game, the one or more assigned hidden points for each object are individually revealed to the player until the entire supplemental award has been revealed.

* * * * *